Figure 1:
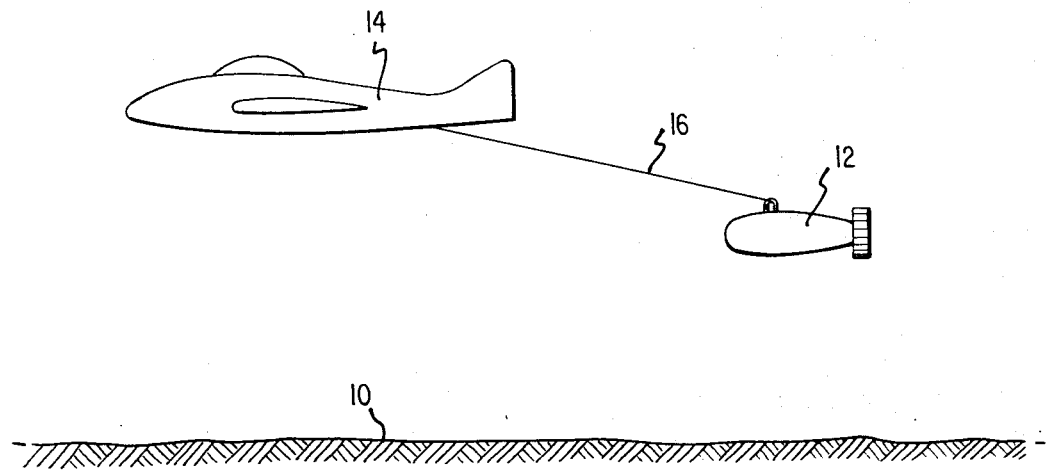

United States Patent

[11] 3,629,694

| [72] | Inventor | Daniel P. Hearn<br>Tulsa, Okla. |
|---|---|---|
| [21] | Appl. No. | 92,319 |
| [22] | Filed | Nov. 23, 1970 |
| [45] | Patented | Dec. 21, 1971 |
| [73] | Assignee | Atlantic Richfield Company<br>Continuation of application Ser. No.<br>595,185, Nov. 17, 1966, now abandoned.<br>This application Nov. 23, 1970, Ser. No.<br>92,319 |

[54] METHOD AND APPARATUS PROVIDING A DIFFERENCE SIGNAL INDICATIVE OF RADIATION ABSORPTION IN A MAGNETOMETER
4 Claims, 2 Drawing Figs.

[52] U.S. Cl. ............................................. 324/0.5,
324/43, 250/218
[51] Int. Cl. .............................................. G01r 33/08
[50] Field of Search ................................... 324/43 L,
43 R; 250/218, 220, 217; 356/205, 206

[56] References Cited
UNITED STATES PATENTS

| 2,278,920 | 4/1942 | Evans et al. | 250/220 R |
| 3,122,702 | 2/1964 | Franken | 324/43 R |
| 3,257,608 | 6/1966 | Bell et al. | 324/43 X |
| 3,396,334 | 8/1968 | Hearn | 324/43 XR |
| 3,158,803 | 11/1964 | Bell | 324/0.5 |
| 3,159,024 | 12/1964 | Tsien | 250/210 |
| 3,183,349 | 5/1965 | Barnes et al. | 250/83.3 IR |
| 3,211,050 | 10/1965 | Pelavin | 250/210 |

OTHER REFERENCES
Bell et al., Physical Review; Vol. 107; No. 6; 9/15/57; pp. 1559–1565

*Primary Examiner*—Walter Stolwein
*Attorney*—McLean, Morton & Boustead

ABSTRACT: An optically pumped magnetometer including a radiation source, a radiation absorption cell through which radiation from the source passes, a radiation detector for detecting radiation passing from the absorption cell, and means for creating a radio frequency magnetic field in the absorption cell, and including a second radiation detector receiving radiation from the source but not passing through the absorption cell. The two detector outputs are combined in a balancing circuit to provide a difference signal indicative of the radiation absorption.

PATENTED DEC21 1971  3,629,694

INVENTOR
DANIEL P. HEARN

BY McLean, Morton & Boustead

ATTORNEYS.

METHOD AND APPARATUS PROVIDING A DIFFERENCE SIGNAL INDICATIVE OF RADIATION ABSORPTION IN A MAGNETOMETER

This is a combination of application Ser. No. 595,185 filed Nov. 17, 1966, now abandoned.

This invention relates to a method and an apparatus comprising an instrument for high-quality detection of minute magnetic field intensities utilizing optical absorption magnetometers, and more particularly, to a method of removing undesirable interference and noise from the detected readings of an optical absorption magnetometer by optically detecting the interference and differentially combining the detected interference with the detected reading of the magnetometer.

The recent advent of high-sensitivity optical absorption magnetometers to measure minute fluctuations in the intensity of the earth's magnetic field has greatly expanded the ability of geophysical prospectors to locate and identify subterranean deposits of oil and precious metals. Furthermore, the precision of magnetic field detection by optical absorption magnetometers is so exact that such magnetometers permit airborne exploration of uncharted terrain, thereby greatly increasing both the speed of geophysical exploration and the ability of prospectors to each remote and inaccessible terrain for geophysical examination. In such airborne exploration, the optical absorption magnetometer generally is positioned within an aerodynamically shaped, nonmagnetic shell which is towed at a distance remote from a propelling aircraft to effectively isolate the detecting magnetometer from the magnetic field distortion produced both by the metallic structure of the craft and by the electronic equipment aboard the craft. The remoteness of the electronic power supply aboard the aircraft from the electrically operable optical absorption magnetometer, however, necessitates a long flexible electrical interconnection which greatly increases the vulnerability of the detection system to leakage and interference thereby greatly distorting both the magnetic field readings and their subsequent interpretation.

Other serious errors often are introduced into the magnetic field survey by such indeterminate factors as a variation in the intensity of the radiant light source of the magnetometer which variation in intensity can be produced by minute fluctuations or vibrations in the output of the magnetometer lamp excitation power supply. Furthermore, the generation of noise in either the lamp excitation power supply located within the aircraft or the light detection cell within the magnetometer can result in false readings and considerable economic losses produced by a misinterpretation of the measured magnetic field data.

It is therefore an object of this invention to provide a high-sensitivity optical absorption magnetometer capable of producing highly accurate magnetic field intensity measurements containing a minimum of distortion.

It is a further object of this invention to provide an atomic magnetometer wherein errors introduced into the measured magnetic field data by both fluctuations in the intensity of the magnetometer radiant light source and noise within the light detection cell circuits are effectively eliminated.

These and other objects of this invention are obtained by providing an optical absorption magnetometer having dual matched radiant light detection cells, the outputs of which cells are differentially connected to balance out any variation in indicated magnetic field readings produced by the internally generated noises of the lamp. Fluctuations in the intensity of the radiant light source are compensated for by sectioning and directing the emitted radiation so that a first portion of the radiant light impinges upon a first of the detection cells after passing through the magnetometer absorption cell while a second portion of the emitted rays from the same radiant light source strikes the second detection cell without alteration due to magnetic field modulation. Because of the differential connection of the outputs of the magnetometer detection cells, fluctuations in intensity of illumination impinging equally upon the detection cells are balanced out and an output signal is produced dependent only upon the degree of absorption of the radiant light in the absorption cell.

Thus, this invention generally encompasses the production of radiant emissions of luminous energy in dual portions of approximately equal intensities from a single source with one portion of the radiant emission being directed through an absorption cell upon a first detector thereby producing an output from the first detector proportional to the intensity of the impinging light. The second portion of radiant emission is directed upon a second detector having matching characteristics with the first detector to produce an output from the second detector proportional to the intensity of the unmodulated rays from the source of radiant emission. The output of the first detector is balanced against the output of the second detector to produce a difference signal indicative of the modulation of the one portion of the radiant emission in the absorption cell and, indirectly, the magnetic field intensity of the substrata. The difference signal can then be amplified to produce a permanent record relatively free from errors produced by interference or noise within the instrument or power supply. A preferred method of differentially connecting the detection cells is by a Wheatstone bridge arrangement with the detection cells forming two arms of the bridge. A fixed and an adjustable resistor form the other two arms of the bridge with the adjustable resistor permitting perfect bridge balance irrespective of minute variations in the physical characteristics of the matched detection cells or the light transfer coefficients of the medium traversed.

To further assist in reducing inaccurate magnetic field readings resulting from noise in the exciter lamp producing the radiant light when helium magnetometers are utilized, a lens filter is positioned intermediate the detection cells and the source of radiant light to limit the radiant energy reaching the detection cells to a narrow band including only the 1.08 micron resonance line, which band is the only light which contributes to the significant signal.

Figure 2:
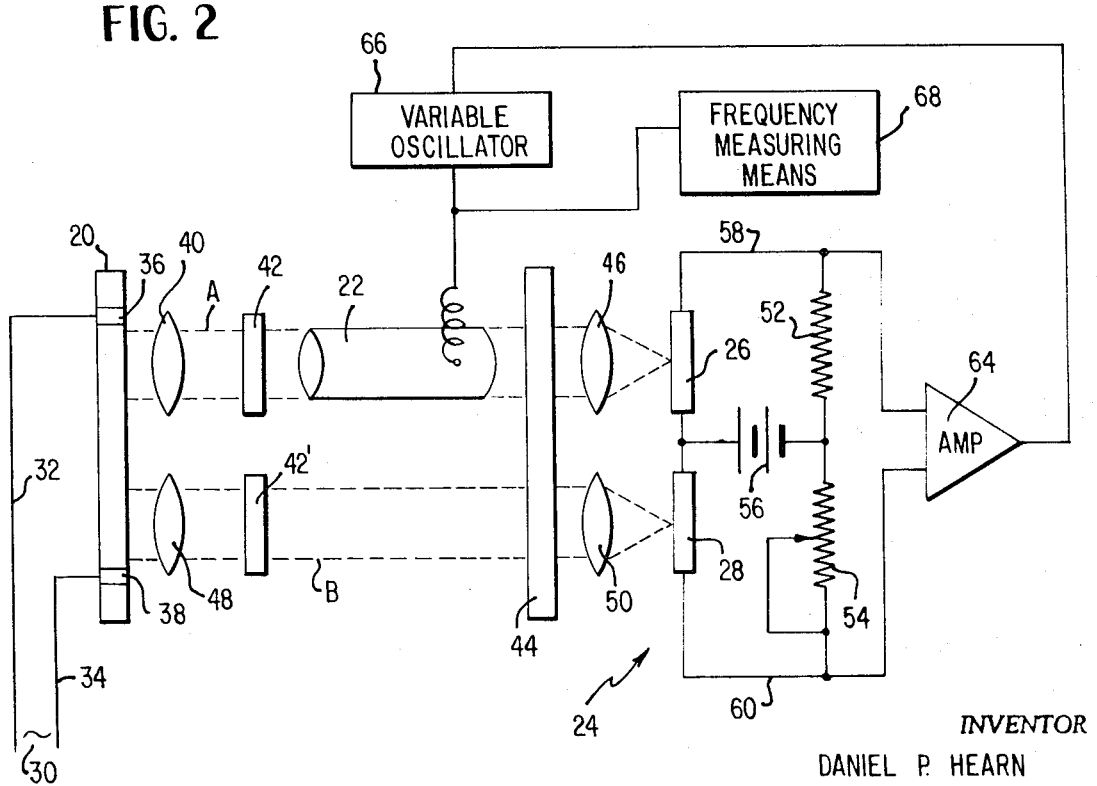

A more complete understanding of the basic principles of this invention can be obtained from the appended drawings in which:

FIG. 1 is a pictorial portrayal of the conduction of a geophysical survey utilizing airborne optical absorption magnetometers, and FIG. 2 schematically depicts the low-noise magnetometer of this invention utilizing dual detection cells.

Referring more particularly to FIG. 1, a geophysical survey of terrain 10 is conducted aeromagnetically by an optical absorption magnetometer positioned within an aerodynamically shaped, nonmagnetic device, i.e., bird 12 which, in turn, is towed by aircraft 14 by means of tow cable 16 positioned intermediate aircraft 14 and bird 12. The tow cable performs the dual function of maintaining the bird at a relatively fixed altitude relative to the aircraft dependent upon the forward speed of aircraft 14 and the length of tow cable 16 and providing electrical energy, generated within aircraft 14, to power the optical absorption magnetometer positioned within bird 12. While the elongated length of tow cable 16 effectively isolates the highly sensitive magnetometer from the magnetic field distortions produced by the electronic equipment within aircraft 14, and the metallic shell of the aircraft, it also enhances the possibility of both electrical leakage and intercepted interference resulting in a distortion of the magnetic field readings produced by the magnetometer.

The optical absorption magnetometer system of this invention, as depicted in FIG. 2, suitable for positioning within bird 12 can be any one of the family of spin precision magnetometers, e.g., the proton precision magnetometer, the alkali-vapor rubidium and cesium instruments or, preferably the metastable helium magnetometer, and basically includes a source of radiant light, e.g., a helium excitation lamp 20, an absorption cell 22 and a balanced detection system 24 having dual detection cells 26 and 28. Light source 20 is powered by a constant radiofrequency power supply 30 located within aircraft and connected to light source 20 by conductors 32 and 34 positioned within tow cable 16 and metallic bands 36 and 38 located at spaced positions along the length of the lamp. The resonant radiation emitted from source 20 is divided into two portions A and B traversing diverse but essentially parallel paths. The first portion A of the emitted radiant light passes through a pair of lenses 40 and 42 which collimate and optically polarize the rays, respectively, before they are directed through absorption cell 22 wherein a modulation of the radiant energy is accomplished proportional to the strength of the magnetic field in which cell 22 is positioned. The amount of light absorbed is actually useful since it provides a measure of the depumping frequency for the helium atoms in the cell 22 and this frequency is proportional to the magnetic field. Because the details of the magnetometer, including the means for aligning the atoms within the absorption cell of the optical magnetometer, do not form a part of this invention and are well known in the art as exemplified by U.S. Pat. No. 3,122,702, issued to P. A. Franken and U.S. Pat. No. 3,071,721, issued to H. G. Dehmelt, details of the magnetometer have been omitted from this description and drawings for purposes of clarity. The modulated radiation rays exiting absorption cell 22 are filtered 44 before being focused by lens 46 upon detection cell 26 of balanced detection system 24.

The second portion B of the resonant radiation emitted from source 20 passes through collimating lens 48, lens 42', filter 44 and focusing lens 50, before impinging upon detection cell 28 to produce an output proportional to the intensity of the impinging radiation. Components 48, 42' and 50 are identical to components 40, 42 and 46, respectively.

Filter 44 is provided to assist in the reduction of undesirable noises within the system by passing only rays of radiant light in those wavelengths which will contribute to the significant signal. For example, in a helium magnetometer only the 1.08 micron light, comprising ½ of 1 percent of the total radiation produced by the helium exciter lamp, contributes to the significant detected signal.

Balanced detection system 24 is basically a Wheatstone bridge configuration with detection cells 26 and 28 forming two variable arms of the bridge. Any means of measuring the difference in the output between the cells can, however, be used. In the instant bridge a fixed resistor 52 and a variable resistor 54 form the remaining two arms of the bridge with a high voltage direct current potential 56 supplied from aircraft 14 through tow cable 16 being connected between the junction formed by detection cells 26 and 28 and the juncture formed by resistors 52 and 54 to power the bridge. The degree of imbalance of the bridge, as detected across juncture 58 formed by detection cell 26 and resistor 52 and juncture 60, formed by detection cell 28 and variable resistor 54, is fed to amplifier 64 to produce an output signal indicative of the absorption of light as it passes through absorption cell 22. The output of amplifier 64 is used as an input for a variable oscillator 66 which directs a radio frequency magnetic field into cell 22 to depump the optically excited helium atoms therein and oscillator 66 is controlled by this input to obtain maximum depumping which is measured by maximum absorption of light in cell 22. The frequency at which maximum depumping occurs is proportional to the magnetic field in which cell 22 is arranged and is measured by means 68.

Detection cells 26 and 28 are high-impedance light sensitive detectors possessing particular sensitivity to radiant energy having a wavelength within the band of the significant signal to be detected, e.g., lead sulfide cells having a maximum sensitivity in a zone including 1.08 micron light have been found suitable as detectors in helium magnetometers. The detection cells are connected within the bridge network in such a manner that equal variations in both detection cells will be balanced by the bridge to cancel any fluctuation in the detected output as measured across terminals 58 and 60. However, variations in the output of detection cell 26 produced by the degree of absorption or modulation of light within absorption cell 22 pass undiminished through detection system 24 to provide the data necessary for a geophysical, i.e. magnetic field survey. Although preferably the detection cells are of such a characteristic nature that their resistance fluctuates with the intensity of impinging light, it is to be realized that matched optical detectors which generate a voltage proportional to the degree of absorbed light also can be utilized without departing from the scope of this invention.

In the operation of the high-sensitivity balanced magnetometer of this invention radiofrequency electrical energy from source 30 excites elongated radiant energy tube 20 to generate rays of radiant light. Portion A of the radiant light traverses a first path through the aligned atoms in absorption cell 22 and lenses 40, 42, 44 and 46 before impinging upon detector 26 to produce an output proportional to the intensity of impinging light. Portion B of the radiant rays from the elongated tube are directed through components 48, 42, 44 and 50 upon detector 28 to produce an output from the detector proportional to the intensity of the detected light and the bridge is balanced by means of variable resistor 54 to produce an initial output, preferably zero, across terminals 58 and 60. As the degree of absorption of radiant light within cell 22 changes with variations in the magnetic field of the terrain being surveyed, detection circuit 24 becomes unbalanced and an output voltage is produced which is indicative of the degree of absorption or modulation within the absorption cell. However, those fluctuations in the radiant energy output of the elongated lamp produced by such factors as vibrations or noise within voltage source 30 are detected equally by detection cells 26 and 28 and are balanced out within the detection circuit so as not to produce an erroneous reading upon output terminals 58 and 60. Similarly, stray interference introduced into voltage source 56 by the elongated length of tow line 16 will be balanced by the bridge configuration to minimize the effect of such disturbance upon the detected output. The amount of absorption or modulation of the light in absorption cell 22 is, as mentioned above, proportional to the depumping frequency of the atoms in the cell. Where the absorption of light is a maximum this frequency is correct and this frequency is proportional to the magnetic field.

What is claimed is:

1. In a method of measuring the intensity of minute magnetic fields with an optical absorption magnetometer having a source for the emission of radiation including radiation of a particular wavelength comprising directing a first portion of said emitted radiation of said particular wavelength through a radiation absorption cell, in which radiation of said particular wavelength is absorbed, and upon a first detector responsive to radiation of said particular wavelength to produce an output from said first detector proportional to the intensity of impinging radiation of said particular wavelength, and subjecting said radiation absorption cell to a radiofrequency magnetic field, the improvement of directing a second portion of emitted radiation of said particular wavelength upon a second and similar detector to produce an output from said second detector proportional to the intensity of impinging radiation of said particular wavelength from said source, balancing the output of said first detector against the output of said second detector to produce a difference signal, said difference signal being an improved measure of the magnetometer resonance, and controlling the frequency of said radio frequency magnetic field by feedback of said difference signal so as to achieve maximum absorption of said particular wavelength.

2. The improvement of claim 1 where said optical absorption magnetometer is a helium magnetometer.

3. In a device for measuring the strength of a magnetic field comprising a contained body of gas selected from the group consisting of alkali metals and helium, the atoms of which are acted upon by said magnetic field when in the presence thereof, means to excite the body of gas for continuously producing metastable atoms, a source of resonance radiation including radiation of a particular wavelength impinging upon and interacting with the body of gas for producing alignment of said metastable atoms contained therein, means to create and direct into the body of gas a radiofrequency magnetic field of such frequency as to diminish the alignment of metastable atoms contained in the body of gas including a variable frequency oscillator, and means to measure changes in the amount of resonance radiation of said particular wavelength absorbed by said metastable atoms including radiation detector means sensitive to said particular wavelength, the improvement wherein said source of resonance radiation directs radiation along two paths, one said path being through said body of gas and the second said path bypassing said body of gas, said radiation detector means including two separate detectors each sensitive to said particular wavelength, one said detector producing an output proportional to the intensity of the resonance radiation of said particular wavelength reaching that one said detector via said one path and the second said detector producing an output proportional to the intensity of the resonance radiation of said particular wavelength reaching that second said detector via said second path, and including means for balancing the outputs from said first and second detectors to produce a difference signal, means for connecting said difference signal as an input to said variable frequency oscillator to vary the output frequency thereof and obtain maximum absorption of radiation of said particular wavelength, and means for measuring the frequency at which maximum absorption of radiation of said particular wavelength is obtained as a measure of the magnetic field surrounding said body of gas.

4. The improvement of claim 3 where said contained body of gas is helium.

* * * * *